United States Patent [19]

Boeke et al.

[11] Patent Number: 4,965,328

[45] Date of Patent: Oct. 23, 1990

[54] PREPARATION OF PASTE FORMING VINYL CHLORIDE POLYMERS WITH HIGH PRESSURE HOMOGENIZATION

[75] Inventors: Burkhard Boeke; Josef Kalka, both of Haltern; Hermann Winter, Marl, all of Fed. Rep. of Germany

[73] Assignee: Huels Aktiengesellschaft, Marl, Fed. Rep. of Germany

[21] Appl. No.: 394,455

[22] Filed: Aug. 16, 1989

Related U.S. Application Data

[63] Continuation of Ser. No. 881,746, Jul. 3, 1986, abandoned, which is a continuation of Ser. No. 750,244, Jul. 1, 1985, abandoned, which is a continuation of Ser. No. 551,033, Nov. 14, 1983, abandoned.

[30] Foreign Application Priority Data

Nov. 13, 1982 [DE] Fed. Rep. of Germany ....... 3242088

[51] Int. Cl.$^5$ .............................................. C08F 2/24
[52] U.S. Cl. ..................................... 526/212; 526/88
[58] Field of Search ........................................ 526/212

[56] References Cited

U.S. PATENT DOCUMENTS

| | | | |
|---|---|---|---|
| 3,324,097 | 6/1967 | Pears | 526/212 |
| 4,071,675 | 1/1978 | Yu | 526/193 |
| 4,093,581 | 6/1978 | Anderson | 526/212 |
| 4,186,259 | 1/1980 | Bush | 526/212 |
| 4,273,904 | 6/1981 | Bush | 526/212 |
| 4,286,081 | 8/1981 | Mikofalvy | 526/74 |
| 4,292,420 | 9/1981 | Turner | 526/212 |
| 4,292,424 | 9/1981 | Huddleston | 526/212 |
| 4,310,649 | 1/1982 | Sjolin | 526/212 |
| 4,371,677 | 2/1983 | Morningstar | 526/212 |

*Primary Examiner*—Christopher Henderson
*Attorney, Agent, or Firm*—Millen, White & Zelano

[57] ABSTRACT

Paste-forming vinyl chloride polymers are prepared using an emulsifier system of:
(a) an alkali metal or ammonium salt of a fatty acid, alkylsulfonic acid, alkylarylsulfonic acid or a sulfosuccinic acid ester in quantities of 0.2 to 3.0 by weight with respect to the quantity of monomers,
(b) a straight chain or branched $C_{12}$–$C_{20}$ alkanol in quantities of 50 to 200% by weight with respect to the amount of surface active agent (a) used,
(c) water and optionally,
(d) a monomer-soluble catalyst. The emulsifier system is homogenized by means of homogenizing apparatus, and, subsequently is mixed with the monomer. Polymerization ensues. Pastes based on this polymer exhibit low viscosities, a near Newtonian flow behavior and good storage stability.

15 Claims, No Drawings

PREPARATION OF PASTE FORMING VINYL CHLORIDE POLYMERS WITH HIGH PRESSURE HOMOGENIZATION

This is a continuation of application Ser. No. 06/881,746 of 07/03/86, now abandoned, which is a continuation of Ser. No. 06/750,244 of 07/01/85, now abandoned, which is a continuation of Ser. No. 06/551,033 of 11/14/83, now abandoned.

BACKGROUND OF THE INVENTION

This invention relates to a process for preparing vinyl chloride polymers by discontinuous polymerization in the presence of oil soluble or water soluble catalysts and emulsifiers, as well as polymerization adjuvants.

The polymers obtained according to the process of this invention are particularly suitable for the preparation of plastisols with very low vicosities, not only in the low but also in the high shear range. This effect is especially desirable in the processing of plastisols by coating processes. Low paste viscosities in the lower shear ranges facilitate the handling of the pastes, e.g., transporation and screenability, and are self-venting during processing. Low paste viscosities in the high shear range permit high processing rates. Plastisols prepared from the polymers produced according to this invention have high stability in storage.

It is known to prepare polyvinyl chloride suitable for the production of pastes by continuous or discontinuous processes.

The continuous process produces a PVC paste with a desirably low viscosity in the high shear range, but with a high viscosity at low shear velocities. Furthermore, such polyvinyl chlorides have a high proportion of emulsifiers. High emulsifier concentrations are detrimental in the end products and in processing. They reduce the transparency and increase the sensitivity to water of the polymers and the articles produced from them.

In the discontinuous process, in principle two process variants are knwon. By the so-called microsuspension process, latices with a relatively low solids content of about 40% by weight are obtained. The spray drying of these latices therefore results in increased drying costs. The spray dried products result in pastes with a pronounced dilatant flow behavior. They are thus poorly suited for the application of spread-coating methods.

A two-stage microsuspension process is known from FR 20 86 635, describing the production of PVC latices with high solids concentrations. The operation of the process, however, requires the preparation of a seed latex in addition to the step of prehomogenizing and is thus expensive.

The discontinuous operation of the emulsion polymerization of vinyl chloride yields polymers with low emulsifier contents. In polymerizations with low amounts of emulsifiers to obtain stable latices and paste-forming polyvinyl chlorides with low paste vicosities, it has been proposed to use the so-called seed latex method. The method consists of providing a seed latex (germ latex or primary dispersion) prior to the emulsion polymerization. This process is, however, highly expensive on a large industrial scale, as the primary dispersion must be prepared separately, stored and dosed. Furthermore, the stability that may be obtained with the latices prepared in this manner is not optimal and the viscosities of the polyvinyl chloride pastes obtained by this method are clearly higher than the viscosities of pastes obtained by the continuous process.

According to the process of DE No. P 1964 029 and the laid-open text of Belgian patent No. 656 985, the emulsifier is added during the polymerization process according to a definite program. It is possible by this procedure to prepare polyvinyl chloride with particularly low emulsifier contents. But the polyvinyl chloride pastes obtained by this process have an even significantly higher viscosity than those obtained by the continuous process.

Discontinuous processes are known which use dispersing agents (fatty alcohols). The following can be cited to illustrate the state of this art:

1. DE-OS No. 22 60 957 (BP No. 1383100)
2. DE-AS No. 26 29 655 (U.S. Pat. No. 4,310,649)
3. DE-OS No. 28 50 105
4. DE-OS No. 27 42 178 (U.S. Pat. No. 4,093,581)
5. EP No. 00 30 524
6. DE Application No. P 32 10 891.5 (U.S. Ser. No. 478,766 of Mar. 25, 1983)

The disclosures of all of these references are incorporated by reference herein.

The polymerizations of processes 1, 2 and 3 are effected using oil soluble activators, in part with the addition of reducing agents. These processes lead to products which, when processed into plastisols, exhibit strongly dilatant flow characteristics, as shown by the comparative experiment A of German application No. P 32 10 891.5 and its U.S. equivalent.

Process 4 uses inorganic catalysts for activation. According to 4, a mixture consisting of a $C_{16}$–$C_{20}$ alkyl alcohol and an alkyl sulfate ($C_{12}$–$C_{18}$) is used in the polymerization. As shown by comparative experiments B and C of the German application No. P 3210891.5 and its U.S. equivalent, only unstable latices or latices low in solids are obtained by process 4. After spray drying, these yield a polyvinyl chloride resulting in high viscosity pastes with a pronounced pseudoplastic flow behavior.

According to process 5, a water soluble substance is initially homogenized in the presence of water and an emulsifier. Subsequently, the monomer and the initiator are added. Successful execution of this proces requires the presence of a seed latex (stabilizing latex) and the process is thus relatively expensive.

According to process 6, an emulsifier system consisting of a surface active agent and a long chain alcohol is added to the polymerization formulation which uses inorganic initiators. As shown by comparative experiment B herein, a polyvinyl chloride yielding low viscosity pastes is obtained but the storage stability of the pastes is not optimal.

SUMMARY OF THE INVENTION

Accordingly, it is an object of this insertion to provide a process which combines the advantages of the continuous process with those of the discontinuous process, e.g., a process yielding polyvinyl chloride having the lowest emulsifier content, enabling the production of pastes with low viscosity in the low and high shear ranges and which is stable in storage.

Upon further study of the specification and appended claims, further objects and advantages of this invention will become apparent to those skilled in the art.

These disadvantages of the state of the art are overcome and these objects have been attained by this invention by providing a process for preparing a paste-forming polymer of vinyl chloride and 0–30% by weight of a copolymerizable monomer by discontinuously polymerizing the monomers in the presence of a water or monomer-soluble catalyst, an emulsifier system of emulsifiers and long chain alcohols, wherein the emulsifier system comprises:

(a) an alkali metal salt or an ammonium salt of a branched or straight chain fatty acid containing 12 to 18 C atoms, of a branched or straight chain alkylsulfonic acid containing 10 to 20 C atoms, of an alkylarylsulfonic acid containing 8 to 18 C atoms in the branched or straight chain alkyl portion or of a sulfosuccinic acid ester containing 6 to 14 C atoms in the alcohol portion, in quantities of 0.2 to 3.0% by weight with respect to the total weight of monomers, (b) a straight chain or branched $C_{12}$–$C_{20}$ alkanol in quantities of 50 to 200% by weight with respect to the amount of surface active agent (a) used, (c) water, and optionally, (d) a catalyst soluble in the monomer, which comprises homogenizing the emulsifier system by means of a homogenizing machine, subsequently mixing it with a mixture of vinyl chloride and, optionally, copolymerizable monomers, and thereafter, polymerizing the resultant mixture.

DETAILED DISCUSSION OF THE INVENTION

The process of this invention permits the preparation of latices with a solids content of up to 50% by weight without the appreciable formation of undesirable coagulate. The viscosity of pastes based on the PVC obtained by the process of this invention is low and the pastes exhibit a near Newtonian flow behavior. The pastes are also highly stable in storage.

Suitable aqueous emulsifier systems for use in this invention comprise:

(a) alkali metal or ammonium salts of fatty acids, alkylsulfonic acids, alkylarylsulfonic acids or sulfosuccinic acid esters in amounts of 0.2 to 3% by weight, preferably 0.5 to 1.5% by weight, with respect to the monomer, (b) a straight chain or branched $C_{12}$–$C_{20}$ alkyl alcohol or a mixture of several such alochols in quantities of 50 to 200% by weight, preferably 70 to 150% by weight, with respect to the surface active agent used.

Suitable alkali metal (e.g., Na or K) or ammonium salts of fatty acids to be used as emulsifier components (surface active agents), include those having 12 to 18 carbon atoms in their alkyl chains. They may be straight chained or branched. The following may be employed, for example: sodium laurate, sodium myristate, sodium palmitate, sodium-iso-palmitate, sodium stearate, etc. The corresponding potassium and ammonium salts are also suitable.

Suitable alkali metal or ammonium salts of alkylsulfonic acids include those containing in their alkyl portions 10 to 20 carbon atoms, preferably 14 to 17 carbon atoms. These may also be straight chained or branched. The following may be employed, for example: sodium decylsulfonate, sodium dodecylsulfonate, sodium myristyl sulfonate, sodium palmityl sulfonate, sodium stearylsulfonate, sodium heptadecylsulfonate, sodium arachylsulfonate, etc. The potassium or ammonium salts may be used with similar results. Generally, mixtures of such species will be preferred, such as those obtained in the sulfonation of industrial alkane mixtures.

Suitable alkali metal or ammonium salts of alkylarylsulfonic acids include those with 8 to 18, preferably 10 to 13 carbon atoms and are straight chained or branched. The following examples may be cited: sodium tetrapropylenebenzenesulfonate, sodium (p- or m-) dodecylbenzenesulfonate, sodium octadecylbenzenesulfonate, sodium octylbenzenesulfonate, sodium decylvenzenesulfonate, sodium tridecylbenzenesulfonate, sodium tetradecylbenzenesulfonate, sodium pentadecylbenzenesulfonate, sodium hexadecylbenzenesulfonate, etc. Preferably, mixtures of such species are used. The potassium or ammonium salts may also be employed equivalently.

Suitable alkali metal and ammonium salts of sulfosuccinic acid esters include those having an alcohol portion of 6 to 14 carbon atoms, preferably 8 to 10 carbon atoms, and are straight or branched. The following may be cited as examples: sodium dihexylsulfosuccinate, sodium dioctylsulfosuccinate, sodium di-2-ethylhexylsulfosuccinate, sodium didecylsulfosuccinate, sodium didodecylsulfosuccinate, sodium diisodecylsulfosuccinate, sodium diisododecylsulfosuccinate, sodium ditridecylsulfosuccinate, sodium ditetradecylsulfosuccinate and the corresponding potassium and ammonium salts. Mixtures of the aforementioned emulsifiers may also be employed. These emulsifiers generally have the formula:

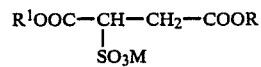

wherein R and $R^1$ are each $C_6$-14-alkyl; and M is ammonium or an alkali metal.

Mixtures of the three general classes of emulsifiers can also be used.

As dispersing agents, straight chain or branched $C_{12}$–$C_{20}$ alcohols (alkanols) may be used, for example lauryl alcohol, myristyl alcohol, palmityl alcohol, stearyl alcohol, arachyl alcohol, 2-hexyldecanol, 2-octyldodecanol, etc. Mixtures of these alcohols may also be employed.

The components (a) and (b) of the emulsifier system should be dissolved or dispersed in water. If an initiator soluble in the monomer is chosen for the polymerization, it is also added to this mixture. Subsequently, the mixture is homogenized by means of a fully conventional homogenizing apparatus, e.g., a mono- or multiple degree high pressure homogenizer using pressures from 50 up to 200 bar, the set time being 1 to 10 min. In general, a sufficiently homogenous mixture is one in which samples on the order of 0.001–0.004 $\mu m^3$ will have the same compositional analysis. If the melting points of the fatty alcohols or other ingredients are higher than room temperature, the dispersing and homogenizing processes are advantageously effected at temperatures of 30° to 70° C., i.e., above the melting temperatures of such components, usually the fatty alcohols.

In choosing a suitable, monomer soluble initiator, care must be taken that it does not appreciably decompose during the dispersion and homogenizing processes. Preferably, the initiators are used which at the required homogenizing temperature have half-life values of more than 10 hours, preferably more than 20 hours. If in view of the high melting point of a fatty alcohol employed, an initiator with a long half-life is selected, the subsequent polymerization reaction should be conventionally controlled by means of an addition of suitable reducing agents, such as those discussed below in amounts, e.g., of 10-50 weight % based on the weight of catalyst. See also, e.g., the monograph of Kainer, Polyvinylchlorid und Vinylchlorid-Mischpolymerisate, Springer Verlag, Berlin, Heidelberg, New York, (1965), p. 46-49. whose disclosure is incorporated by reference herein.

Up to 50% by weight of the total amount of water to be used in the polymerization may be placed in the reaction vessel first, while the remaining portion should be added later with the homogenized dispersion, i.e., about 50%; however, where a monomer soluble catalyst is included in the homogenizate and an activator/controller such as a reducing agent is co-employed, about 40% of the water is added in the homogenizate and 5-10% with the activator/controller (e.g., as a 0.1-1.0 weight % solution thereof). In the case of a water soluble catalyst, 5-10% of the water is added with the catalyst (e.g., as a 0.1-2 weight % solution of the catalyst), and 5-10% with the activator/controller (e.g., as a 0.1-1.0 weight % solution) which can optionally also be used with a water soluble catalyst. It is also possible to add the entire quantity of water in the homogenization step, but this would be less favorable from an energetic standpoint. Conventional buffer salts may be added to the water, such as for example sodium pyrophosphate, sodium acetate, sodium borate, etc., in conventional amounts. Approximately 40% of the entire volume of water should be included in the homogenization in any case.

Once the water and homogenizate has been added, vinyl chloride monomer or a mixture of vinyl chloride and copolymerizable monomers are then added to the reactor under agitation. Following the establishment of the desired polymerization temperature, the polymerization reaction is started and controlled by means of the initiator system chosen e.g., by addition of the water soluble catalyst or of the addition/controller in the case of a monomer soluble catalyst. When the monomer soluble catalyst is used without an activator/controller (reducing agent), the polymerization is initiatet merely by combining the homogenized emulsifier system (which contains the catalyst) and the monomers and achieving the desired polymerization temperature.

It is particularly advantageous in relation to latex stability to introduce initially only 20 to 80% by weight, preferably 40 to 60% by weight, of the homogenized dispersion of the polymerization and to add the rest, freshly homogenized, after a polymerization conversion of 20 to 60%, preferably 30 to 50% (in batches or continuously).

Suitable co-monomers include e.g.: vinyl acetate, vinylidene chloride, vinyl ether, acrylo nitrile, acrylic acid ester, etc. The comonomer may be present in the copolymer in quantities up to 30, preferably 1 to 20% by weight based on the total monomer weight.

The ratio of amount of monomer to water may vary over an arbitrarily broad range, up to very high vinyl chloride concentrations (approx. 1:0.5 to 1:1.6). In general, it is desirable to effect the polymerization so that latices with the highest possible solids content, for example 45 to 50% by weight are achieved.

Final conversion should obviously be as high as possible.

The fully conventional per compounds may be used as the water soluble catalysts, including $H_2O_2$, potassium persulfate and the redox systems described for example in Kainer, "Mixed Polymers of Polyvinyl Chloride and Vinyl Chloride", Springer Verlag Press, 1965, p. 46, ff, whose disclosure is incorporated by reference herein.

With the usual conventional consideration of the prevailing dispersion and homogenizing temperature, monomer soluble initiators and—if necessary—reducing agents customarily used in redox reactions, may be used. The following may be mentioned as examples of suitable monomer soluble initiators: azo compounds, such as azobis-isobutyronitrile, 2,2'-azo-bis-(2,4-dimethylvaleronitrile), etc., or peroxides, such as dicyclohexylperoxidicarbonate, di-n-butylperoxidicarbonate, di-lauroylperoxide, dibenzoylperoxide, dipropionylperoxide, tertbutyl-peroxi-2-ethylhexanoate, tertbutyl-peroxibenzoate, cumylhydroperoxide, tert-butylhydroperoxide etc. Examples of suitable reducing agents include sodium thiosulfate, sodium formaldehydesulfoxilate, ascorbic acid, or isoascorbic acid, etc.

All initiators may be added in the usual amounts of 0.005 to 0.5% by weight, preferably 0.01 to 0.1% by weight, with respect to the amount of monomer.

Selection of polymerizing temperature is fully conventional and is usually 40°-70° C. in dependence on the molecular weight desired. The polymerizing time depends—as always—on the polymerization temperature and the concentration of the catalyst. It is usually approximately 4 to 16 hours. Agitation should be effected with the customary circumferential velocities of 10 to 70 rpm and by means of the blade agitators usually employed in emulsion or microsuspension polymerizing processes. Unless indicated otherwise herein, all the details of the process of this invention are fully conventional, e.g., as disclosed in Ullmanns Encyclopaedie der technischen Chemie, Vol. 19, Verlag Chemie, Weinheim, Deerfield Beach (Florida), Basel, page 346, whose disclosure is incorporated by reference herein.

Details of the use of the polymers produced by this invention are also fully conventional, especially their use in forming pastes and in spread coating; see, e.g., Kunststoff-Hanbuch, Polyvinylchlorid, Vol. II, Part 1, Carl Hanser Verlag, Muenchen, (1963), page 409-438, whose disclosure is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

EXAMPLE 1

In a 2 $m^3$ vessel, 1,650 kg of demineralized water at 60° C. is introduced. Under agitation, 18 kg of sodium alkylbenzenesulfonate (mixtures of $C_{10}$-$C_{13}$ alkylbenzene sulfonates), 22 kg of a mixture of approximately equal parts of cetyl and stearyl alcohol and 1.5 kg of tertbutylperbenzoate, are added. The mixture is passed through a single stage piston pump homogenizer. The pressure in the homogenizer head is 180 bar and the recycle time (set time) 5 min. The homogenized mixture is transported with the exclusion of atmospheric oxygen into a 6 $m^3$ agitated autoclave, capable of being cooled or heated by means of a jacket. (The autoclave is equipped with a reflux condenser). 1,800 g of vinyl chloride is added. The mixture is heated to 52° C. The velocity of the agitator is set at 10 rpm. The reaction is initiated by the metered addition of a 0.2% aqueous ascorbic acid solution. The subsequent dosage is set so that with a nearly full cooling capacity (Jacket: 150,000 kcal/h; reflux condenser: 30,000 kcal/h), the polymerization temperature remains constant at 52° C. Time to the pressure drop is 5 hours.

The processing of the dispersion (solids content 47.1%) is effected in a spray drying installation. The inlet temperature of the drying air is 160° C., the outlet temperature 60° C. Otherwise, processing is conducted as described in DE-AS No. 21 46 735, whose disclosure is incorporated by reference herein.

A paste is prepared from 100 parts by weight of the polyvinyl chloride powder obtained in this manner and 60 parts by weight of di-2-ethylhexylphthalate (DOP). Its viscosity is measured after standing for 2 and 24 hours at different shear velocities in a rotation rheometer (instrument: Rheomat 30 of the Contraves AG, Zurich). The thickening factor EF is a measure of the stability in storage of the paste. It is determined by the quotient of the value of viscosity, determined after standing for 24 hours, divided by the viscosity value after standing for 24 hours, at a shear velocity of $D=1$ $s^{-1}$. The table shows the pasate viscosities at different shear velocities, together with the thickening factor EF.

EXAMPLE 2

The operation is performed as in Example 1, but no tert-butylperbenzoate is added. Prior to homogenizing, 3.5 kg of monosodium phosphate is added to the charge.

The polymerization reaction is initiated by means of a 0.5% aqueous solution of $H_2O_2$ and a 0.2% aqueous ascorbic acid solution (in equal parts) and is controlled.

Following the completion of the reaction, the solids content of the dispersion is 46.5%. The dispersion is processed as in Example 1. The paste viscosities of the powder, converted to paste with DOP in a ratio of 100:60, and the thickening factor of the paste may be seen in the table.

EXAMPLES 3 AND 4

The operation is performed as in Example 2, but as the emulsifier 18 kg of a $C_{12}$-$C_{18}$ mixture of sodium alkylsulfonates is used. The solids content of the dispersion is 46.2% (Example 3).

Using 18 kg of sodium di-2-ethylhexylsulfosuccinate, the solids content of the dispersion amounts to 47.5% (Example 4).

The dispersions are processed as in Example 1. The viscosities of the powders, prepared with DOP in a proportion of 100:60 and the stability in storage of the pastes may be seen in the table.

EXAMPLE 5

The operation is performed as in Example 1, but as the emulsifier a mixture of 10.8 kg of sodium myristate and 7.2 kg of sodium alkylbenzenesulfonate is used. 0.4 kg of sodium hydroxide is also added to the water.

The reaction is initiated and controlled with a 0.5% aqueous sodium formaldehyde sulfoxilate solution.

The dispersion is processed (solids content 48.3%) as in Example 1. The pH value of the aqueous product extract is adjusted to 5.5 by means of a 6% oxalic acid solution and is sprayed with it in an atomizing installation (mode of operation according to Example 3 of DE-P No. 25 31 780, whose disclosure is incorporated by reference herein). The viscosities of the pastes prepared with DOP in a proportion of 100:60, together with the stability in storage, are seen in the table.

COMPARATIVE EXPERIMENT A (Corresponds to DE-OS No. 27 42 178)

The mode of operation is as in Example 2, but the homogenizing step is omitted. The polymerizing charge coagulates and thus cannot be pumped or processed by means of spray drying.

COMPARATIVE EXPERIMENTS B TO D (According to DE No. 32 10 891.5)

The charged materials and quantities are selected as in Examples 2, 3 and 4. The process is effected as described in Example 1 of DE P No. 32 10 891.5.

The processing of the dispersion is effected as in Example 1. The viscosities of the pastes of the powder, prepared with DOP in a ratio of 100:60 and the thickening factor may be seen in the table.

| Example or Comparative Experiment | Paste viscosities (PVC/DOP ratio 100/60) in dPa at a shear velocity D in $s^{-1}$ | | | | | | | | Thickening Factor EF ($\eta$ 24 h/$\eta$ 2 h) at $D= 1 s^{-1}$ |
|---|---|---|---|---|---|---|---|---|---|
| | D=0.3 | | D=1 | | D=10 | | D=100 | | |
| | 2 h | 24 h | 2 h | 24 h | 2 h | 24 h | 2 h | 24 h | |
| 1 | 36 | 41 | 27 | 27 | 22 | 24 | 25 | 29 | 1.0 |
| 2 | 50 | 65 | 45 | 52 | 44 | 48 | 42 | 42 | 1.2 |
| 3 | 85 | 100 | 50 | 61 | 38 | 45 | 38 | 42 | 1.2 |
| 4 | 90 | 110 | 47 | 52 | 40 | 42 | 40 | 41 | 1.1 |
| 5 | 70 | 70 | 57 | 57 | 46 | 48 | 40 | 43 | 1.0 |
| A | — | — | — | — | — | — | — | — | — |
| B | 62 | 105 | 50 | 85 | 44 | 66 | 42 | 55 | 1.7 |
| C | 85 | 210 | 65 | 130 | 46 | 85 | 44 | 70 | 2.0 |
| D | 95 | 161 | 45 | 72 | 40 | 58 | 38 | 54 | 1.6 |

The preceding examples can be repeated with similar success by substituting the generically or specifically described reactants and/or operating conditions of this inventions for those used in the preceding examples.

From the foregoing description, one skilled in the art can easily ascertain the essential characteristics of this invention and without departing from the spirit and scope thereof, can make various changes and modifications of the invention to adapt it to various usages and conditions.

What is claimed is:

1. A process for preparing a paste-forming polymer of vinyl chloride and 0–30% by weight of a copolymerizable monomer comprising discontinuously polymerizing the monomer in the presence of a water-soluble catalyst, and an emulsifier system of an emulsifier and a long chain alcohol, wherein the emulsifier system comprises:

(a) 0.2 to 3.0% by weight based on the total monomer weight of an alkali metal salt or an ammonium salt of a fatty acid of 12 to 18 C atoms, of an alkylsulfonic acid of 10 to 20 C atoms, of an alkylphenylsulfonic acid of 8 to 18 C atoms in the alkyl portion or a sulfosuccinic acid alkyl ester of 6 to 14 C atoms in each alkyl portion, (b) 50 to 200% by weight based on the weight of (a) above of a $C_{12}$-$C_{20}$ alkanol, and (c) water, comprising homogenizing the emulsifier system, mixing the homogenized mixture with the monomers to be polymerized and then polymerizing the monomers, the total amount of water in the polymerization being such that the weight ratio of total monomer to total water is 1:0.5 to 1:1.6, and the amount of catalyst being catalytically effective, wherein the homogenization is conducted by means of a high-pressure homogenizer using pressures from 500 to 200 bar and a time of 1 to 10 minutes, whereby the homogenization of the emulsifier system is such that samples thereof on the order of 0.001–0.004 $\mu m^3$ have the same compositional analysis.

2. A process of claim 1, wherein 20 to 80% by weight of the homogenized mixture is introduced into a polymerization reactor before the monomers are introduced therein, and the remainder of the homogenized mixture is subsequently introduced thereto after a polymerization conversion of 20 to 60% has been attained.

3. A process of claim 1 wherein component (a) is 0.5 to 1.5% by weight on the same basis of a sodium, potassium or ammonium salt of a $C_{12-18}$- fatty acid, on said basis.

4. A process of claim 1 wherein component (a) is 0.5 to 1.5% by weight on the same basis of a sodium, potassium or ammonium salt of a $C_{14-17}$- alkylsulfonic acid.

5. A process of claim 1 wherein component (a) is 0.5 to 1.5% by weight on the same basis of a sodium, potassium or ammonium salt of a $C_{10-13}$- alkphenylsulfonic acid.

6. A process of claim 1 wherein component (a) is 0.5 to 1.5% by weight on the same basis of a sodium, potassium or ammonium salt of a sulfosuccinic acid $C_{8-10}$- alkyl ester.

7. A process of claim 1 wherein the amount of component (b) is 70–50% by weight on the same basis.

8. A process of claim 1 wherein at least 40% of the total amount of polymerization water is used to homogeneously dissolve or disperse the components of the emulsifier system.

9. A process of claim 1 wherein a reducing agent is further added to the polymerization medium.

10. A process of claim 1 wherein 1–20% of comonomers are included in the polymerization batch.

11. A process of claim 1 wherein the solid content of the reaction medium after completion of polymerization is 45–50%.

12. A process of claim 1 wherein a water soluble catalyst is used selected from the group consisting of $H_2O_2$ or a per-compound.

13. A process of claim 1 wherein the reaction temperature is 40°–70° C.

14. A process of claim 9 wherein the reducing agent is sodium thiosulfate, sodium formaldehydesulfoxilate, ascorbic acid, or isoascorbic acid.

15. A process of claim 9 wherein the polymerization is initiated by an addition of the reducing agent.

* * * * *